E. D. KEETER.
SAW FILING MACHINE.
APPLICATION FILED SEPT. 2, 1908.
935,912.
Patented Oct. 5, 1909.
3 SHEETS—SHEET 2.
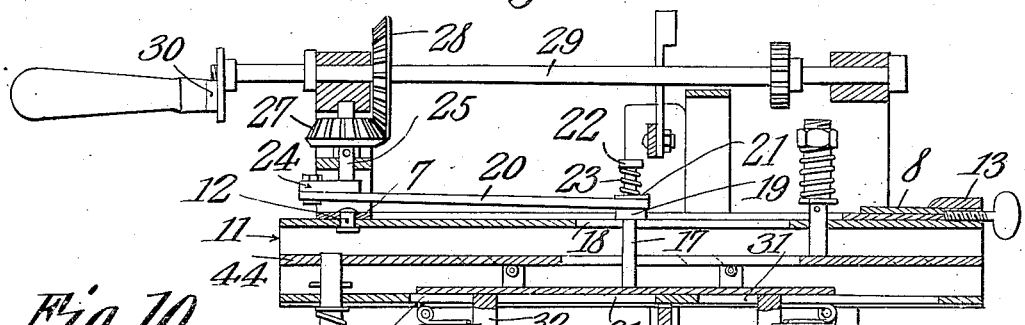
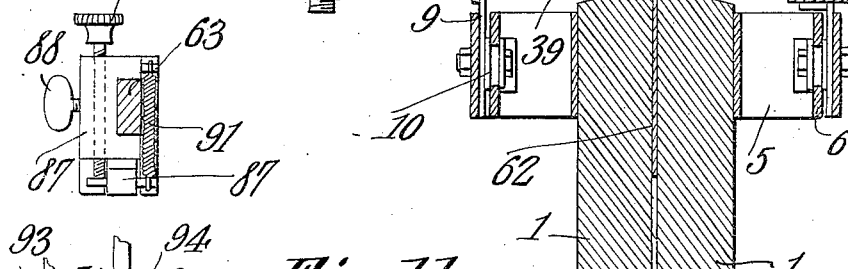
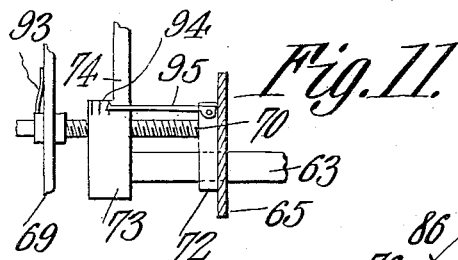
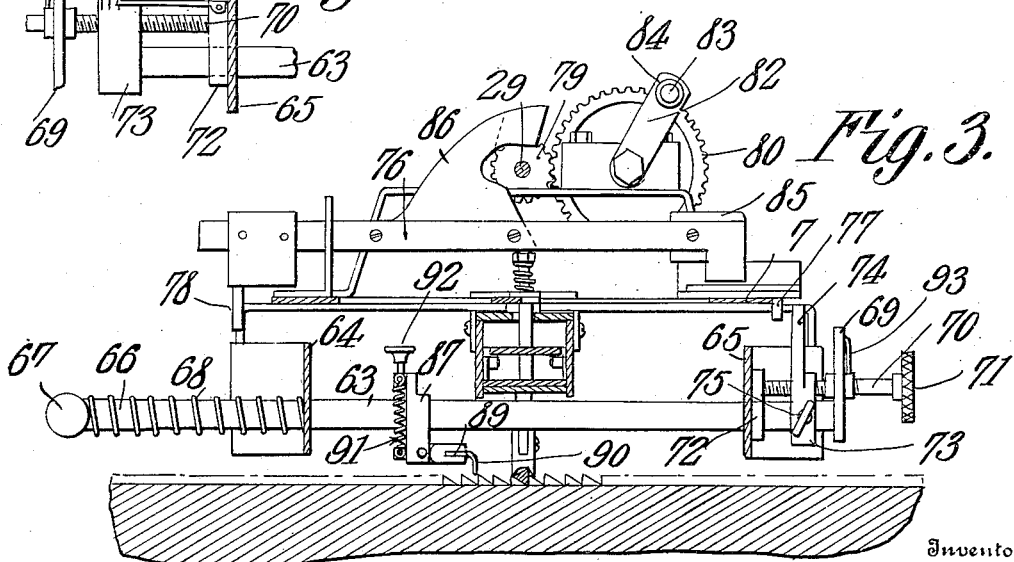
Inventor
Edward D. Keeter.
Witnesses
By C. A. Snow & Co.
Attorneys

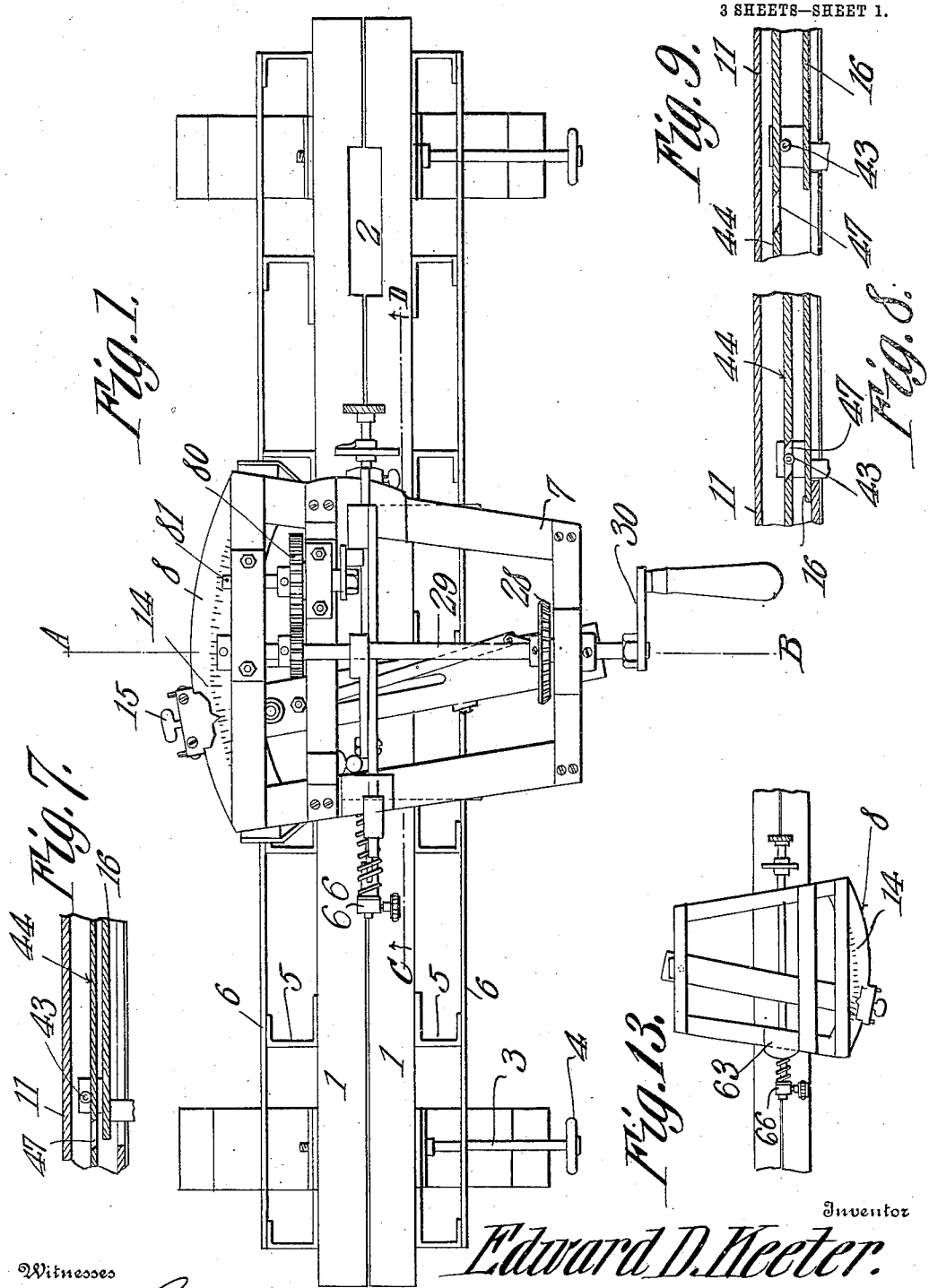

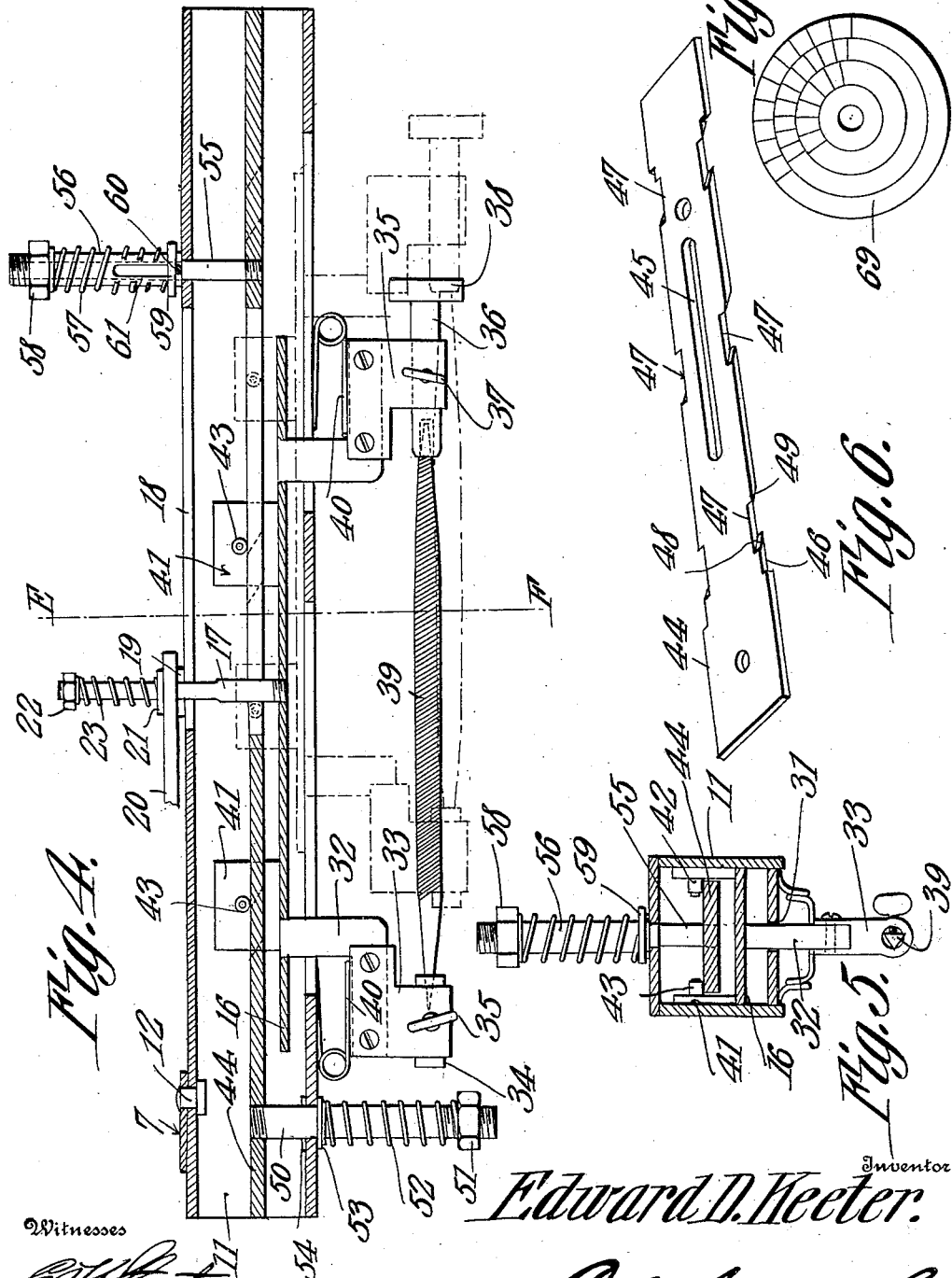

UNITED STATES PATENT OFFICE.

EDWARD D. KEETER, OF SALISBURY, NORTH CAROLINA.

SAW-FILING MACHINE.

935,912.   Specification of Letters Patent.   Patented Oct. 5, 1909.

Application filed September 2, 1908. Serial No. 451,373.

*To all whom it may concern:*

Be it known that I, EDWARD D. KEETER, a citizen of the United States, residing at Salisbury, in the county of Rowan and State of North Carolina, have invented a new and useful Saw-Filing Machine, of which the following is a specification.

This invention has reference to improvements in saw-filing machines, and its object is to produce a machine whereby the operation of filing saws may be very expeditiously and accurately performed.

By means of the present machine the saw is firmly clamped into position and the file is brought into engagement with one tooth of the saw at a time and at the proper angle, and is caused to reciprocate a sufficient number of times to properly sharpen a saw-tooth, the construction of the apparatus being such that the file engages the saw-tooth only when moving in one direction, and the return stroke is inactive to the saw-tooth. Provision is made whereby a sufficient number of active strokes of the file is given to a tooth, and then the file is fed forward to engage the next tooth, in order, having the same angle of cut, and this operation continues automatically so long as the machine is kept in motion, power being applied to the machine either by hand or in any other suitable manner. Furthermore, provision is made whereby the machine may be reversed on its supporting guides without reversing the direction of feed along the saw-blade, so that the angle of cut of the file having been once accurately adjusted, the machine may be reversed as to its relation to the saw, but still fed along the same in the proper direction, so that the cut on the teeth having the same angle as those first cut, will be very accurately established without the necessity of readjusting the angle, with the attendant possibility of errors.

The several features of the invention will be best understood from a consideration of the following detailed description, taken in connection with the accompanying drawings, forming a part of this specification, in which drawings:—

Figure 1 is plan view of the saw-filing machine forming the subject matter of the present invention. Fig. 2 is a section of the structure shown in Fig. 1 on the line A—B thereof, with the file-carrier in a median position. Fig. 3 is a vertical section on the line C—D of Fig. 1, the file-carrier also being shown in the median position. Fig. 4 is a longitudinal vertical section of the file-carrier and the co-acting structures on a larger scale than shown in Figs. 1, 2 and 3. Fig. 5 is a vertical cross section on the line E—F of Fig. 4. Fig. 6 is a perspective view of the cam plate used in connection with the structure of Fig. 4. Figs. 7, 8 and 9 are detail views illustrating phases of operation of portions of the machine. Fig. 10 is an end view of the feeding dog-carrying block showing the actuating rod in section. Fig. 11 is a side view of the feed-adjusting means with adjacent parts in section. Fig. 12 is a view of the index disk. Fig. 13 is a plan view showing the relative positions of the file-carrier and feed mechanism when the file-carrier is reversed.

Referring to the drawings, there are shown two cheeks or blocks 1, 1, of suitable length and shape to clamp the blade of a saw between them, with the teeth of the saw projecting. These two blocks or cheeks 1, 1, may be similar to the jaws of a saw clamp, except that they should be as long or longer than the blade of the saw to be filed, or, if the device is to be used for filing saws of different lengths, then the blocks 1, 1, should be as long or longer than the longest blade to be filed. In the particular instance shown in the drawings, the blocks are indicated as considerably longer than the blade of the saw to be filed, and provision is made for the clamping of ordinary hand saws between the blocks, the meeting faces of the blocks being cut out, as indicated at 2, for the reception of the handle of the saw. Near each end of the blocks are hand screws 3, each provided with a hand wheel 4, and the arrangement is such that the blocks may be separated or forced one toward the other by the manipulation of the hand wheels 4, so as to separate the blocks for the reception of a saw-blade or the removal thereof, and to bring the blocks together to firmly clamp a saw-blade between them, with the teeth of the saw projecting beyond the upper edges of the meeting faces of the blocks. Fast to these jaws, on the faces thereof remote from those engaging the saw, are spaced brackets 5, carrying at their outer ends tracks 6, parallel with the blocks 1, and serving as supports for certain of the structures, to be presently described. Each track 6 is made of two members spaced apart in a vertical plane, for a purpose which will hereinafter appear.

Mounted upon the tracks 6 is a frame 7, shown in the drawings as approximately segmentally shaped, but it may be otherwise shaped if desired. One end 8 of this frame is curved from a center substantially coincident with the opposite end of the frame. The frame 7 is provided with legs or supports 9, each of which carries a flanged roller 10, engaging in the space between the two members of the respective tracks 6, and traveling on the lower member of said track, the upper member serving as a guide.

Carried by the frame 7 is a casing 11, preferably, though not necessarily, rectangular in cross section, and this casing is long in proportion to its breadth or height, and, as will hereinafter appear, said casing constitutes a portion of the file-carrying mechanism. The casing 11 is connected near one end to the frame 7, at the end of the latter remote from the curved member 8, by a pivot 12, so that the casing 11 may be turned about the pivot 12 as a vertical axis. The upper end of the casing 11 is formed with a lip 13 embracing the outer edge of the frame member 8, and the lip 13 is provided with a pointer 14, in operative relation to an index displayed upon the upper face of the member 8, this index being for the purpose of facilitating the setting of the casing 11 at any desired angle to the line of travel of the frame 7. The arrangement is such that when the casing 11 is midway between the two sides of the frame 7 it is at right angles to the line of travel of the frame, and the casing may be adjusted to either side of this median position as may be desired. Of course, instead of an index and pointer, any other means for facilitating the location and adjustment of the casing 11 about its axis may be provided. A set screw 15 carried by the free end of the casing 11 is provided for the purpose of locking the said casing in adjusted positions by engaging with the outer edge of the frame member 8.

Within the casing 11 there is housed a plate 16 from a middle point on which there rises a post 17, extending up through a longitudinal slot 18 in the top of the casing and for a distance above the same. The stem 17 outside of the casing 11 carries a collar 19, upon which rests one end of a pitman 20, through a suitable bearing in which pitman the stem 17 projects. Above the pitman the stem 17 carries a washer 21, and at the extreme upper end of the stem 17 is threaded, for the reception of a nut 22, between which and the washer 21 the stem is surrounded by a helical spring 23, which spring serves to hold the pitman 20 against the collar 19 and the latter against the top of the casing when, as will hereinafter appear, the stem 17 is moved longitudinally.

The pitman 20 has the end remote from that engaging the stem 17, connected to the end of a crank 24 on one end of an upright shaft 25 journaled in a support 26 erected on the frame 17 above the pivot end of the casing 11. The end of the shaft 25 remote from the crank 24 carries a beveled gear 27 meshing with another gear 28 fast on a shaft 29 mounted in bearings carried by the frame 7 and extending across the frame parallel with the casing 11. In one end of the shaft 29 there is secured a hand crank 30, by means of which rotative motion may be imparted to the said shaft, when it is desirable to drive the machine by hand power, but, of course, it is to be understood that when other power is used to drive the machine, such power will be applied to the shaft 39 in any suitable manner.

When the shaft 29 is rotated motion is imparted to the shaft 25 through the gears 27 and 28, and the rotative motion of the shaft 25 is converted into reciprocatory motion through the crank 24 and pitman 20 to the stem 17 and plate 16.

In the lower wall of the casing 11 are two longitudinal slots 31, 31, in line one with the other. Extending through these slots 31 are two studs or hangers 32, one near each end of the plate 16. The lower ends of the studs 32 are bent at an angle so as to extend parallel with the plate 16, and fast to these studs or hangers 32 are brackets 33, one for each hanger 32. One of these brackets 33 carries a block 34 clamped in place in the brackets by means of a thumb screw 35. The other bracket 33 carries a block 36, which may be clamped in place by a set screw 37, and this block 36 is provided with a manipulating head 38, so that the block 36 may be readily turned on its longitudinal axis, when the thumb or set screw 37 is loosened. The two blocks 34 and 36 are appropriately recessed to receive the ends of a file 39, such as is commonly used in the operation of filing saws. The files are usually of the three-cornered or triangular shape, and when one edge becomes dulled from wear, then another edge is presented to the saw, and finally, before the file becomes useless, the third edge may be utilized. This necessitates the turning of the file in its holder from time to time, and the setting of the file at the proper angle, so that its edge is in proper relation to the saw-teeth, considering the file in cross section. In order to readily turn the file on its longitudinal axis to present a new edge to the saw-teeth, the thumb screw 37 may be slightly loosened, and then the file may be turned by manipulation of the head 38, and when the new position is obtained the file may be clamped in place by tightening the thumb screw 37. Fast on the upper edge of each hanger 32 is a spring 40, there being, in the particular instance shown, two springs for each hanger, and these springs diverge so as to engage the under side of the bottom of the casing 11, near the outer edges thereof.

It will be understood of course that a single spring sufficiently broad to straddle the slot 31 may be used.

Near each end of the plate 16, within the casing 11, there is formed an upwardly directed stud 41, and each stud carries an inwardly directed pin 42, upon which is mounted a roller 43, the several rollers 43 turning on horizontal axes.

Within the casing 11, above the plate 16, is another plate 44, best shown in Fig. 6, from which it will be seen that this plate has, about midway of its length, a longitudinal slot 45. On each edge of the plate 44 and extending for the greater portion of its length, is a longitudinal recess 46, and entering the body of the plate from each recess 46 is a series of short recesses 47, each recess 47 having its end walls inclined in the same direction as shown at 48 and 49, for a purpose which will presently appear. In the particular structure shown in the drawings there are three recesses 47 in each side of the plates 44, and these recesses are equi-distantly disposed and are spaced apart the same distance as the rollers 43 on each side of the plate 16. The plate 44 is about the same length as the casing 11, and near one end of the plate there is secured to it a rod 50 extending down through a suitable perforation in the bottom of the casing 11, and this rod ultimately terminates in a threaded end to which is applied a nut 51. The rod 50 outside the casing 11 is surrounded by a helical spring 52, bearing at one end against the nut 51 and at the other end against a washer 53, engaging the under side of the casing 11. The spring 52 tends to move the rod and with it the plate 44 in a direction toward the bottom of the casing 11, but this movement is limited by a pin 54, extending through the rod 50 within the casing 11.

The tension of the spring 52 is readily adjusted by means of the nut 51. Near the other end of the plate 44 there is secured thereto another rod 55, extending upward through the top of the casing 11, through a suitable perforation provided for the purpose.

The rod 55 enters a sleeve 56, fast on top the casing 11, and this sleeve is surrounded by a helical spring 57, the upper end of which engages a nut 58, applied to the end of the sleeve 56, which is suitably threaded for the purpose. The end of the spring 57 remote from the nut 58 engages a washer 59, which, in turn, bears upon a pin 60 fast on the rod 55 and projecting through a slot 61, formed on each side of the sleeve 56, at diametrically opposite points thereon.

The tendency of the spring 52 is to depress the corresponding end of the plate 44, but this tendency is resisted by the pin 54, and the tendency of the spring 57 is to depress the corresponding end of the plate 44, but this tendency is resisted by the pin 60, the result being that, under normal conditions, the plate 44 is parallel with the bottom of the casing 11, and a distance therefrom determined by the location of the pins 54 and 60.

Let it be assumed that the parts are in the position shown in Fig. 4, that is, the rollers 43 are upon the upper face of the plate 44, adjacent to but not yet coincident with the corresponding recesses 47, and further let it be assumed that the plate 16 is being moved toward the left, as viewed in Fig. 4, by the action of the propelling means. Under these conditions the plate 16 is elevated to its greatest extent above the bottom of the casing 11, and the springs 40 are under compression, while the spring 23 has been relieved to an extent from compression. A continued movement of the plate 16 toward the left as viewed in Fig. 4, will ultimately bring the rollers 43 into coincidence with the recesses 47 at the left-hand end of the plate 44, and also with the central recesses 47 in said plate. As soon as this occurs the weight of the plate 16 and the parts carried thereby, and also the force stored up in the springs 40 will cause the plate 16 to move downward until arrested by contact with the bottom of the casing 11. The parts are so proportioned that the drop of the plate 16 has brought the rollers 43 to a position midway through said plate 44. This position defines one limit of the reciprocatory movement of the plate 16, and the continued movement of the actuating mechanism starts the plate 16 on the return movement toward the right-hand end of the casing as viewed in Fig. 4. Now, the rollers 43 engage under the inclined end or shoulder 49 of the recesses 47, and since the plate 16 is upon the bottom of the casing 11, and hence cannot move away from the plate 44, the latter is elevated against the action of the springs 52 and 57, because of the cam action of the rollers 43 against the inclined ends or shoulders 49. As soon as the plate 44 is sufficiently elevated the rollers 43 travel on the under side of said plate until they come into coincidence with the recesses 47 at the right-hand end of the plate 44, and with the central recesses therein. As soon as this occurs the springs 52 and 57 immediately return the plate 44 to its normal position, at which point its movement is arrested by the pins 54 and 60. This limits the range of movement of the plate 16 toward the right and the actuating mechanism will now begin to move the plate 16 toward the left again. The rollers 43 now engage the inclined ends or shoulders 48 of the corresponding recesses 47, and, since the plate 44 cannot be further depressed, the rollers 43 will ride up the said ends or shoulders 48 and elevate the plate 16 until these rollers ride upon the upper surface of the plate 44. The movement of the plate is participated in by the file 39, and, consequently, the stroke of the file in one direction is in the depressed position, and in the other direction is in the elevated position.

In Figs. 7 to 9 are shown different phases of the operation of the plate 16. In Fig. 7 the plate 16 is supposed to be moving toward the left, as viewed in said figure, and approaching a recess 47. In Fig. 8 the roller 43 has dropped into the recess 47, and in Fig. 9 the return movement of the plate 16 toward the right is assumed to have begun and the plate 44 has been elevated by the coaction of the roller 43 and inclined end or shoulder 49.

In the position of the parts shown in Fig. 2 the active movement of the file is assumed to be taking place. Under these conditions the file 39 is traversing the toothed edge of the saw 62 clamped in position between the blocks 1, 1. Since the file will not properly cut unless it bears upon the saw-teeth with some pressure, the parts are so adjusted that when the file 39 is brought into engagement with the saw-teeth, the plate 16 has not quite reached engagement with the upper surface of the bottom of the casing 11, so that the springs 52 and 57 are still active to force the file 39 against the body of the saw. Thus the forward stroke of the file becomes active to remove the proper amount of metal from the saw to cause the sharpening of the tooth. On the return movement of the file, the rollers 43 travel on the upper face of the plate 44 and consequently the file is lifted clear from the teeth of the saw, and so has no effect thereon.

In order to impart to the saw-teeth the proper cutting angle, the casing 11 is adjusted about its pivot to one side or the other of the median line of the frame 7 to the proper extent, which extent of adjustment will vary with different types of saw-teeth and different types of saws, and when the adjustment is finally determined upon the casing 11 is locked in position by the set screw 15. When the parts are in this position, the turning of the handle 30 will cause the reciprocation of the file and its active engagement with a tooth of the saw as many times as may be desirable, after which the frame 7, with the parts carried thereby and constituting the file carriage, will be adjusted an appropriate distance along the saw, depending upon the size and character of the teeth.

While the feeding action of the saw carriage may be performed by hand, it is much more desirable that it should be automatic, for the feed will then be performed with great precision. The saw filing machine forming the subject matter of the present invention is therefore provided with a feeding mechanism which will cause the advancing of the file-carrying part the proper distance after a saw-tooth has been subjected to a predetermined number of strokes of the file. For this purpose there is provided a bar 63, preferably, though not necessarily, rectangular in cross section, and this bar is mounted to slide in suitable bearings formed in supporting members 64, 65, depending from the frame 7. One end of the bar 63, beyond the support 64, carries a collar 66, and this sleeve is adjustably secured to the bar by means of a thumb or set screw 67. Surrounding the bar 63, between the collar 66 and the frame member 64, is a helical spring 68, and the strength of this spring may be adjusted as desired by moving the sleeve 66 to or from the frame member 64, and there clamping it by the thumb screw 67. The other end of the bar 63 extends through the frame member 65, and at its extreme end carries a disk 69 with the axis of the disk eccentric to the bar, and through the axis of the disk there is extended a threaded rod 70, having at its outer end a milled head 71 for the manipulation of said rod, and at the other end the rod bears against a plate or block 72 fast on the bar 63, and normally engaging the frame member 65 by action of the spring 68. Adjustably fixed to the rod 63, between the frame member 65 and the disk 69, is a block 73, having a laterally projecting arm 74. This block 73 may be secured to the bar 63 by means of a thumb screw 75.

Mounted on the frame 7, in suitable bearings carried thereby, is another bar 76, parallel with the bar 63, and capable of reciprocatory movement in its support. This bar has at each end a depending finger, 77 and 78 respectively. The finger 77 is in the structure shown in the drawing, and best shown in Fig. 3, so located as to engage the arm 74 when the bar 76 is moved a sufficient distance in the proper direction, which, in the Fig. 3, is toward the right.

Upon the shaft 29 there is mounted a pinion 79, and this pinion is in mesh with a gear-wheel 80, mounted on a short shaft 81 having suitable bearings erected on the frame 7. The shaft 81 carries a crank arm 82, on the free end of which there projects a stud 83 carrying a roller 84. On the bar 76, at the end carrying the finger 77, there is a block 85, in the path of the roller 84, during a portion of its rotative movement about the axis of the shaft 81.

In the particular structure shown in the drawings the shaft 29 makes a number of revolutions to each revolution of the shaft 81, and, consequently, the file will be reciprocated a number of times between each contact of the roller 84 with the block 85. The bar 76 also carries a block 86 on the side of the shaft 81 remote from the block 85, and the purpose of this block 86, as well as that of the finger 78, will appear further on.

Mounted upon the bar 63, between the supports 64 and 65 therefor, is a block 87, which may be clamped in any position of adjustment along said bar by means of a thumb or wing nut or screw 88. At the lower end of this block 87 there is pivoted a dog 89, having at one end a tooth 90. At the end remote from the tooth 90 the dog 89 is under the control of a spring 91, tending at all times to depress the toothed end of the dog. Carried by the block 87 is an adjusting screw 92, acting on the dog 89 in opposition to the spring 91, so that, by suitably manipulating the screw 92, the toothed end of the dog 89 may be elevated, or depressed, depending upon the movement of said screw.

The abutment or block 72 is fast upon the bar 63, and this abutment 72, together with the disk 69, serves simply as a support for the screw 70, and the latter is extended through the block 73, which is suitably threaded for the passage of the rod, so that upon turning the screw rod 70 the block 73 may be adjusted to and from the finger 77, and when the adjustment is accomplished the block 73 may be secured in place by the thumb screw 75. A pointer 93, carried by the screw rod 70 in operative relation to the face of the disk 69 may be employed, and suitable graduations on the face of the disk 69 may be provided to guide the operator in making the necessary adjustment.

Since there are various sizes and types of saw-teeth, the face of the disk 69 will be provided with concentric series of indexes in accordance with the various sizes of saw-teeth, the arrangement being such that a single turn of the screw rod 70 will carry the pointer 93 entirely around a series of the index. In order that the operator may readily ascertain which one of the concentric series of index numbers is to be read with relation to the pointer 93, the said pointer 93 being common to all the concentric series of index numbers, one side of the block 73 is provided with graduations 94, and a co-acting hand or pointer 95 is fixed to the block 72.

In order to cause the feeding action of the file carriage along the saw in proper relation to the number of active movements of the file, the thumb screw 92 is manipulated so as to lower the tooth 90 of the dog 89 until it will engage the saw-teeth. The screw rod 70 is turned a proper distance to bring the arm 74 and finger 77 into a pre-determined definite relation, which, of course, will be determined by the character of the teeth of the saw to be sharpened, and the adjustment may then be made by rotating the rod 70 and observing the index 94 and the proper one of the indices upon the face of the disk 69.

Now, assuming that the parts have all been adjusted as previously described, the crank 30 is rotated, and this will cause a number of active strokes of the file upon some particular saw-tooth. In the meantime, the shaft 81 has been slowly rotated by the engagement of the pinions 79 and 80, and, ultimately, the roller 84 is brought into contact with the block 85. The bar 76 is now moved by the engagement of the roller 84 with the block 85, until ultimately the finger 77 is brought into engagement with the arm 74, and then the bar 63 is moved in a direction in opposition to the spring 78. The movement of the bar 63 will cause the engagement of the tooth 90 with one of the teeth of the saw 62, and since the saw is fixed, the frame 7 will be actuated a corresponding distance. Finally the roller 84 escapes from the block 85, and then the reaction of the spring 68 will return the bar 63 to its initial position, and through the arm 74 and finger 77, the bar 76 will also be returned to its initial position, and the parts are again in condition to be actuated by the engagement of the roller 84 with the block 85 on the next revolution of the shaft 81.

When it is desired to move the file-carrier along the saw to any particular portion thereof, the file is stopped in its upper position and the screw 92 is manipulated so as to carry the tooth 90 out of engagement with the saw-teeth. The entire structure may then be moved along the track 6 to any desired point, and then the tooth 90 may again be brought into engagement with the saw-teeth, and, on a suitable manipulation of the handle 30, the filing of the saw and feeding of the file along the saw will proceed as before.

The file-carrier has been described as being mounted upon rollers 10 engaging between the two members of the track 6. It is also possible to replace these rollers with grooved blocks, which will slide upon the track, instead of rolling thereon.

It is customary to file every other tooth of the saw throughout the length thereof, and then to go over the teeth with the file traveling in the opposite direction. To do this without disturbing the adjustment, the frame 7, with the parts carried thereby, is turned end for end, but the bar 63 is taken out of its bearings and reversed, so that after the frame 7 is turned end for end the bar 63 and the parts carried thereby still have the same relation to the saw. Under these conditions the roller 84 will make contact with the block 86, since the direction of rotation of the shaft 29 is also reversed, and the lug 78 is, under these circumstances, in operative relation with the arm 74, and the sequence of movement of the parts of the machine proceed as before set forth. To file the saw-teeth which were not acted upon during the first operation of the machine, the file-carrier casing 11 is adjusted to the other side of the median line of the frame 7 from that which is occupied during the first part of the process, and then the filing of the teeth not before operated upon proceeds as before.

It is to be understood that while the showing of the drawings is that of an operative structure, the invention is by no means confined to the proportions or shape of the parts shown, since, in these matters, the structure may be largely modified from that shown without in any manner departing from the invention.

What is claimed is:—

1. In a saw-filing machine, a reciprocatory support for the file, and a guide for said support yielding to the support during one phase of the reciprocatory movement of the latter, and engaging and moving the said support perpendicular to the direction of reciprocation during the other phase of its reciprocatory movement.

2. In a saw-filing machine, a reciprocating support for the file, also capable of movement perpendicular to its direction of reciprocation, and a guide for said support also capable of movement perpendicular to the direction of reciprocation of the support, the said support and guide each being held by the other against individual movement toward the saw perpendicular to the direction of reciprocation of the support during such reciprocatory movement of the support.

3. In a saw-filing machine, a reciprocatory support for the file, projecting members carried thereby, a plate in operative relation to said support and provided with inclined recesses adapted to receive the projecting members on the support, said support and plate each yielding in the same direction and each being positively stopped in its movement in the other direction, and means for reciprocating the said support in a direction longitudinal to said plate.

4. In a saw-filing machine, a reciprocatory support for the file, projecting members on said support beyond each end thereof, a plate in operative relation to said support and provided with inclined recesses near each end and at an intermediate point, and adapted to receive the projecting members on the support, said support and plate each yielding in the same direction and each being positively stopped in its movement in the other direction, and means for reciprocating the support in a direction longitudinal to said plate.

5. In a saw-filing machine, a reciprocatory support for the file, projecting members on said support near each end thereof, a plate in operative relation to said support and provided with inclined recesses near each end and at an intermediate point and adapted to receive the projecting members on the support, springs adapted to move the plate in a direction toward the support, springs tending to move the support away from the plate, means for limiting the movement of the plate and file support under the action of the springs, and means for reciprocating the support in a direction longitudinal to the said plate.

6. In a saw-filing machine, a reciprocatory support for the file, projecting members on said support near each end thereof, a casing housing said support, a plate within the casing in operative relation to said support and provided with inclined recesses near each end and at an intermediate point, said recesses being adapted to receive the projecting members of the support, springs tending to move the plate in a direction toward the support and yielding to movement of the plate in the other direction, springs tending to move the support away from the plate and yielding to movement of the support toward the plate, the casing serving to limit the movement of the said support away from the plate, means carried by the plate and co-acting with the casing for limiting the movement of the plate toward the support, and means for reciprocating the support in a direction longitudinal to the said plate.

7. In a saw-filing machine, a carrying member pivotally supported at one end, means at the other end thereof for fixing said carrying member in adjusted position about its pivot, a reciprocatory file support in said carrying member, means for reciprocating said file support, projections on said file support, means tending to move the said file support in a direction perpendicular to its reciprocatory movement, a cam member in said carrying member co-acting with the projections of the file support, and means tending to move the cam member for a limited distance toward the file support.

8. In a saw-filing machine, a casing pivotally supported at one end, means at the other end thereof for fixing said casing in adjusted positions about its pivot, a reciprocatory file support in said casing, means for reciprocating said file support, projections on said file support near each end thereof, means tending to move the file support in a direction perpendicular to its reciprocatory movement, a cam member in said casing having cams near its ends and at an intermediate point co-acting with the projections on the file support, and means tending to move the cam member for a limited distance toward the file support.

9. In a saw-filing machine, a feeding means for the file carrier comprising an elastically controlled longitudinally slidable bar, a dog thereon adapted to engage the teeth of the saw, another longitudinally slidable bar, co-acting means on the two bars for causing the first named bar to move against the elastic controlling means by the movement of the second named bar, and means for moving the second bar at intervals by the actuating means of the machine.

10. In a saw-filing machine, a feeding means for the file-carrier comprising a spring-controlled sliding bar, a dog thereon adapted to engage the teeth of the saw, another sliding bar, a projecting member on the last named bar, an adjustable member on the first named bar co-acting with the projecting member on the last named bar, and means for moving the second named bar at intervals by the actuating means of the machine for bringing the projecting member into engagement with the adjustable member on the first named bar, and thereby move the dog into engagement with the saw-teeth.

11. In a saw-filing machine, a feeding means for the file-carrier comprising a spring-controlled longitudinally slidable bar mounted in the file-carrier and reversible therein, an adjustable member carried by said bar near one end thereof, a dog on the bar for engaging the saw-teeth, another longitudinally slidable bar, a projecting member on each end thereof co-acting with the adjustable member on the first named bar, means driven by the actuating mechanism on the machine for causing the movement of the second named bar, and two spaced means on the second named bar in the path of the actuating mechanism, and either co-acting with the latter in accordance with its direction of movement.

12. In a saw-filing machine, a feeding means for the file-carrier comprising a slidable bar, a dog thereon for engaging the saw-teeth, and means for setting the feeding means for saw-teeth of different sizes, comprising a sliding arm on the bar, means for moving the arm on the bar, an indicator for showing the extent of movement of the sliding bar, and a pointer carried by the bar in operative relation to an index on the sliding arm.

13. In a machine for operating on saws, an indicator having a plurality of series of index markings thereon, an index hand or pointer common to all the index series, an arm adjustable in accordance with the indices, an index carried by the arm and a relatively fixed pointer in operative relation to the index on the arm.

14. In a machine for operating on saws, a sliding bar, an arm adjustable thereon, a screw carried by the bar and acting on the arm to adjust the latter, a pointer carried by the screw and in common operative relation to a plurality of indices, and another pointer carried by the bar in operative relation to an index on the arm.

In testimony that I claim the foregoing as my own, I have hereto affixed my signature in the presence of two witnesses.

EDWARD D. KEETER.

Witnesses:
 JAS. M. WARKER,
 J. ROSS COLHOUN.